United States Patent Office 3,764,504
Patented Oct. 9, 1973

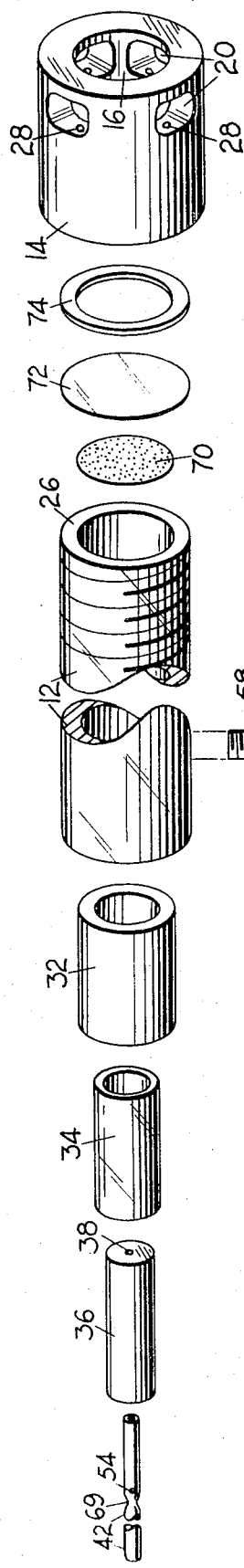
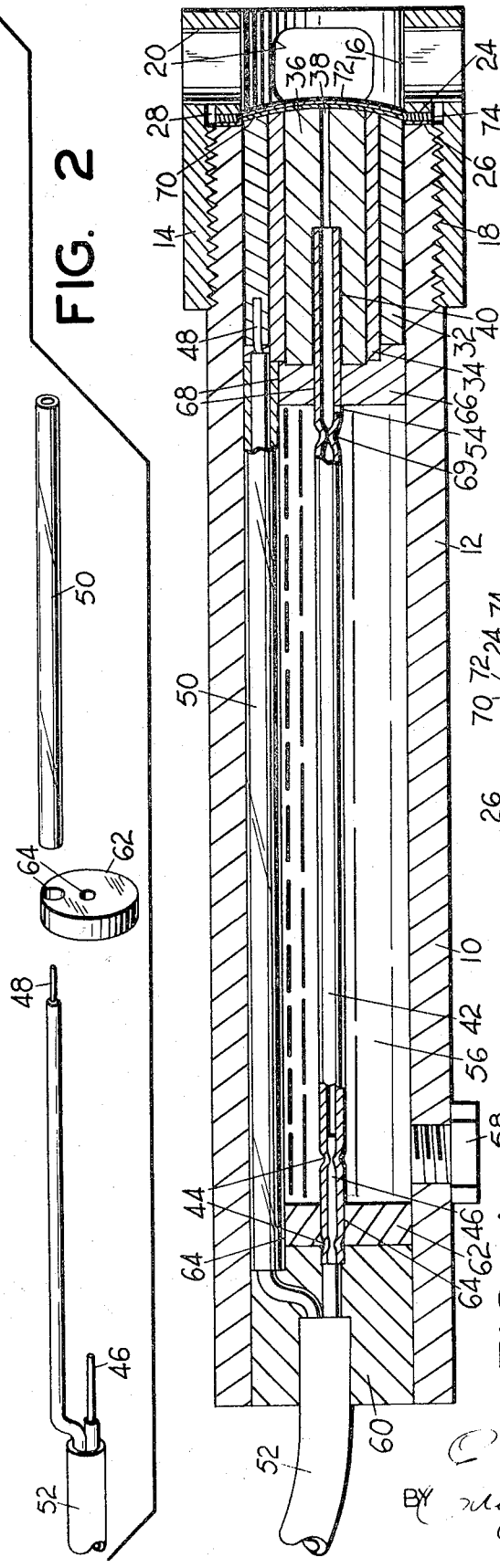
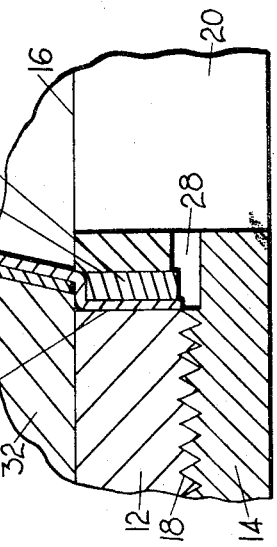

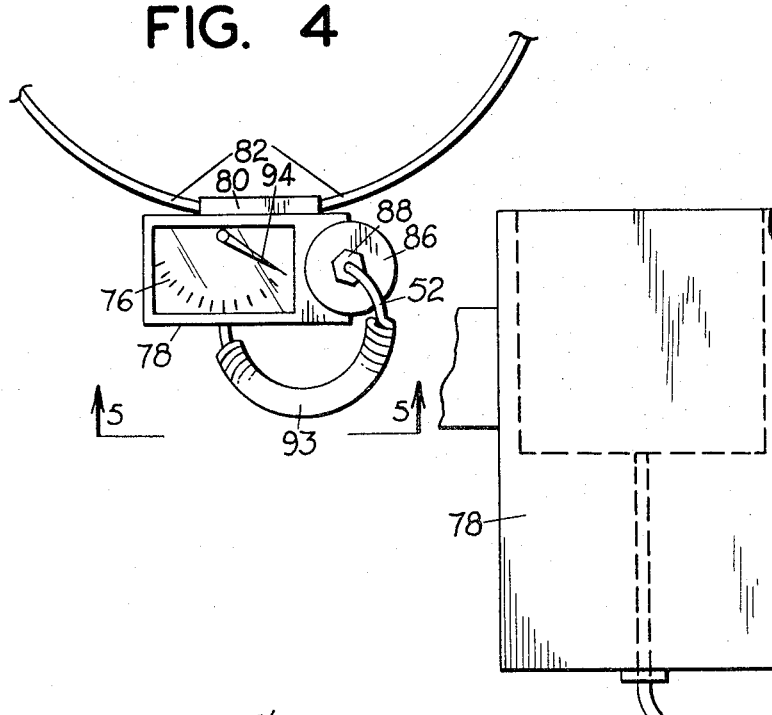
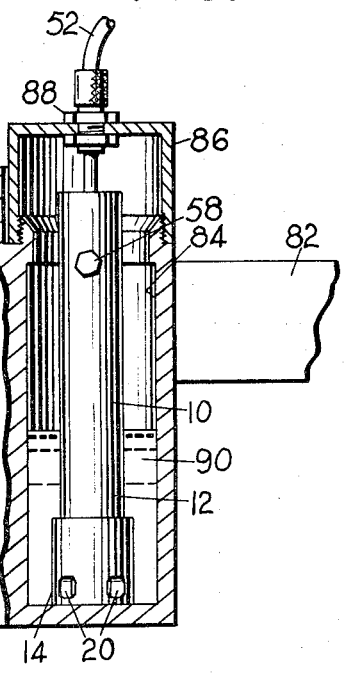
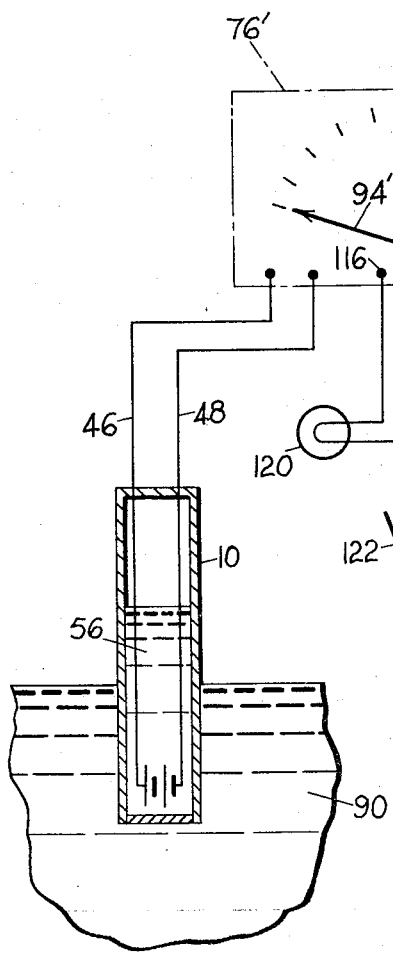
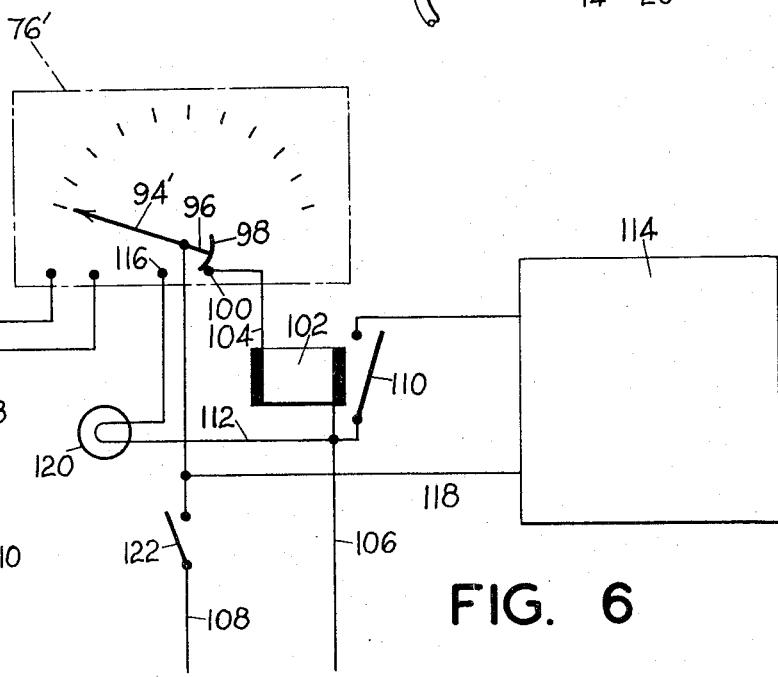

3,764,504
OXYGEN ANALYZING INSTRUMENT
John H. Arff, 118 NE. 24th Ave., Portland, Oreg. 97232, and James R. Burns, 738 SE. 2nd, Hillsboro, Oreg. 97123
Filed June 10, 1970, Ser. No. 45,156
Int. Cl. G01n 27/46
U.S. Cl. 204—195 P
1 Claim

ABSTRACT OF THE DISCLOSURE

An instrument for indicating by its output the dissolved oxygen content in liquids. The instrument has an electric current generating source therein employing a novel structure which evenly distributes an electrolyte of such source on a detecting surface of the instrument whereby dissolved oxygen in the liquid reacts with the electrolyte to control the output of the instrument. The even distribution of the electrolyte on the detecting surface of the instrument utilizes an inner layer of electrolyte absorbing material and an outer layer having minute perforations for admitting oxygen. The instrument is designed particularly for portable use and is adapted to have a novel combination with a holder which includes means for removably supporting the instrument and an electric current responsive instrument electrically connected thereto and arranged to designate the dissolved oxygen content of the liquid in which a portion of the analyzing instrument is submerged. The present analyzing instrument also is designed for controlling the operation of an ozone generator through the medium of a electric current responsive instrument and relay means operated by the latter instrument.

BACKGROUND OF THE INVENTION

This invention relates to new and useful improvements in an oxygen analyzing instrument and a combination of such instrument with an electric current responsive instrument for designating dissolved oxygen content in a liquid or for operating other equipment, or both.

Instruments have heretofore been provided for measuring dissolved oxygen content of liquids, but such instruments have not had the sensitivity required for extreme accurate measurement. Such inefficiency has resulted from an uneven distribution of the liquid on a detecting surface of a current generating portion of the instruments, and such uneven distribution has been the result of buckled or improper stretch relation of membranes on the said detecting surface.

SUMMARY OF THE INVENTION

According to the present invention and forming a primary objective thereof, the oxygen analyzing instrument of the present invention has a head portion with novel detecting means, such detecting means being capable of exposing liquid of which the dissolved oxygen is to be measured uniformly to an electric current producing source which is responsive to the amount of dissolved oxygen in the liquid, and more particularly to provide such detecting means employing an inner layer of electrolyte absorbing sheet material and an outer membrane comprising a finely perforated sheet material stretched over an end portion of the instrument in a manner to uniformly distribute the electrolyte as well as to uniformly distribute oxygen over the electrolyte absorbing layer.

It is another object to provide in a structure of the type described a domed end surface on the pickup surface, the layers of electrolyte absorbing material and the perforated material being held down by a washer and novel head structure in a manner such that the layer of perforated material is stretched at a proper tension and smoothly across the domed surface, thus providing an even distribution of the liquid of which the dissolved oxygen content is to be measured.

Another object is to provide in an instrument of the type described novel inlet means for a liquid to be tested, such novel inlet means including apertures of selected shape to prevent closure thereof by bacteria growth.

Other objects of the invention are to provide an instrument of the type described having a novel structure facilitating its combination with a portable holder, and to provide such a combination wherein a holder therefore includes means for attaching it to a person for portability.

Still another object is to provide in combination an oxygen analyzing instrument of the type described and an electric current responsive instrument operated by the oxygen analyzing instrument and controlling the operation of powered output means such as an ozone generator.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a longitudinal sectional view through an oxygen analyzing instrument embodying features of the present invention;

FIG. 2 is an assembly view of the instrument, such view being in two parts in side by side relation and being defined by bracket means;

FIG. 3 is an enlarged detail view of a joint structure disposed in the detecting head portion of the instrument;

FIG. 4 is a top plan view of a holder for the oxygen analyzing instrument and an electric current operated instrument;

FIG. 5 is an enlarged elevational view of the holder of FIG. 4, partly broken away and taken on the line 5—5 of FIG. 4; and FIG. 6 illustrates an embodiment wherein the present oxygen analyzing instrument is combined with an electric current operated instrument and power output means.

DETAILED DESCRIPTION OF THE PREFERRED EMBODIMENTS

With particular reference first to FIGS. 1, 2 and 3, an oxygen analyzing instrument or probe of the present invention is designated generally by the numeral 10. It comprises a tubular body portion 12 having an end cap 14 at a detecting head end of the instrument. End cap 14 has a bore 16 and a counterbore 18 which is threaded for providing removable support for the end cap 14 on a threaded portion of the body portion 12. End cap 14 has laterally extending, ablong apertures 20 in its outer end portion which provide inlet openings, together with the end opening 16, for liquid to be tested. The counterbore 18 forms with the bore 16 a shoulder 24, best seen in FIG. 3, which faces the end of the instrument opposite that of the detecting head, namely, the handle end, and which cooperates with the end edge 26 of the body portion 12 for clamping certain elements of the instrument in place, as will be described hereinafter. Small vent holes 28 are provided in the cap 14 in a position extending between the counterbore 18 and apertures 20. The function of the holes 28 will be described hereinafter.

Referring now to the current generating portion of the instrument 12, there is employed an outer lead sleeve 32 as an electrode interfitted in the body portion 12, an insulating sleeve 34 interfitted in the sleeve 32, and a cylindrical silver billet electrode 36 interfitted in the sleeve 34. Electrode 36 has an axial bore 38 and a counterbore 40 at the inner end of the bore 38. Fitted in the counterbore 40 is an elongated silver tube 42 which extends to a point adjacent to the opposite end of the housing 12 from the detecting head end and has a crimped connection 44 with a wire 46. Another wire 48 has an end thereof projecting into and electrically connected to the electrode 32. This wire extends to the opposite end of the housing through a protective insulating tube 50 and leads together with wire 46 into an insulated covering 52. Silver tube 42 has an aperture 54 for admitting an electrolyte which is contained within the body portion 12 and designated in FIG. 1 by the numeral 56. Housing 12 has a removable plug 58 for inserting the electrolyte in the reservoir.

The handle end of the body portion 12 has a pair of plugs 60 and 62 therein. Plugs 60 and 62 receive the wires 46 and 48 as well as a portion of the coverings 50 and 52 and serve as their primary purpose to securely connect such wires to the instrument. The plug 62 in addition forms a fluid tight seal at the one end of the body portion as well as an insulating seal, and for this latter purpose it is formed of an insulating material such as a suitable plastic and is cemented in a fluid tight fit in the body portion 12. It has apertures 64 through which the tubes 42 and 50 extend in a fluid tight fit.

A plug 66 is provided at the detecting head end and has apertures 68 for receiving the tubes 42 and 50. Plug 66 also is constructed of insulating material and has an adhesive fluid tight engagement with the body portion 12 and around the tubes 42 and 50. In a preferred construction, the elements 32, 34 and 36 are adhesively sealed together and the element 32 is adhesively sealed to the tube 12 to provide a fluid tight connection. To prevent the electrolyte from reaching the end of the wire 46 in tube 42, the inner portion of the tube is sealed off by a crimp portion 69 disposed between the apertures 54 and the wire 46.

According to the arrangement described, the electrolyte 56 is confined within the body portion 12 between the two plugs 62 and 66 with the exception that it can enter the silver tube 42 through aperture 54 and progress through bore 38 to the end of the detecting head assembly. The wire 48 is protected from the electrolyte by the insulated sleeve 50. In a preferred arrangement the plugs 60 and 66 are formed during assembly by pouring a liquified sealer into the body portion and allowing it to harden. This provides a good sealed connection for housing the electrolyte. The plug 62 may comprise a preformed piece, as shown in the assembly of FIG. 2.

A disc or inner membrane 70 lies on the end of the assembled parts 32, 34 and 36 and a membrane 72 lies on the disc 70 in surface engaging relation. The disc 70 is constructed of a material which will pick up the electrolyte by absorption and evenly disperse it across the end of the current generating elements of the instrument. Such disc may as an example comprise a lens cleaning paper or similar sheet material. The membrane 72 is formed of a thin sheet of material which necessarily is provided with micron size holes to allow inflow or permeation of dissolved oxygen from the outside when the detecting head end of the instrument is projected into a liquid. The membrane 72 comprises a thin, tough plastic sheeting which has micron size holes therein. It has been found that thin polyethylene or Teflon sheeting satisfy the requirements of toughness and the proper seepage or admittance of the oxygen. Thus, in the operation of the instrument, namely, when the detecting head end is immersed in liquid to be tested, the oxygen which permeates membrane 72 reacts with the electrolyte saturated in the disc 70. The output of current from the current generating portion of the instrument is thus proportional to the amount of dissolved oxygen which exists in the liquid.

The operation of the instrument depends considerably in its accuracy on the uniform engagement of the disc 70 with the end surface of the elements 32, 34 and 36. For this purpose, the end surface of said elements is domed as seen in FIG. 1, and means are provided for supporting the disc 70 and membrane 72 in a uniform and firm but not too tight engagement therewith. Such means comprises a resilient washer 74 secured to an outer edge portion of the membrane 72 on the surface directed outwardly. Also, the position of the elements 32, 34, and 36 relative to the body portion 12 is such that the end edge 26 of the body portion is slightly offset longitudinally from the end surface of the elements in a direction toward the handle end of the instrument. Thus, as seen in FIG. 3, when the washer 74 is seated firmly on the end edge 26, by screwing the cap onto the body portion so that shoulder 24 firmly engages the washer and compresses it against the end edge 26, the membrane 72 is drawn over the end surface in a firm and uniform relation. Uniform tightening of the membrane 72 by clamping engagement of the washer 74 between the housing and cap 14 distributes the disc 70 evenly over the end surface of the instrument and distributes the membrane 72 evenly over the disc 70. It is desired that the engagement of the membrane 72 be sufficiently tight as to cause it and the disc 70 to lay down smoothly and uniformly but not so tight as to cause the membrane 72 to buckle or enlarge the micron size holes therein. The absence of irregularities, such as buckled portions, air bubbles, or the like in the disc 70 and membrane 72, contributes to precise and accurate detection of dissolved oxygen in a liquid by the detecting head and also eliminates the necessity of frequent recalibrations of the instrument.

Holes 28 allow for the escape of air which otherwise would be trapped in the joint at the washer 74 and which if trapped would interfere with proper clamped engagement of the washer 74 between the cap 14 and the body portion 12.

In the use of the instrument, the detecting head portion thereof is immersed in the liquid to be tested for oxygen. After a brief interval, the reaction of the electrolyte and the dissolved oxygen in the liquid in which the instrument is immersed produces an output from the current generating portion. The greater the dissolved oxygen content in the liquid the greater the output will be from the current generating portion.

FIGS. 4 and 5 illustrate a combination of the oxygen analyzing instrument, a mircoampmeter 76 operated thereby, and a holder 78 for the two instruments. The holder 78 has a loop 80 on its back wall arranged to receive a belt worn around the waist of a person. Thus, it is apparent thatt he holder can be carried on the person. The holder has an end compartment 84 having a cap 86 threadedly mounted thereon. The insulated wire 52 from the instrument passes through the cap 86 and is connected thereto by a suitable fitting 88, whereby the instrument and cap are connected together and the instrument can be disposed in the compartment 84, head end down, when not in use. Such provides a handy positioning of the instrument such that when it is to be used, cap 86 is merely unscrewed and the instrument removed from the compartment for immersing in a liquid with the head end down. When the instrument has performed its function, it is replaced in the compartment 84. Preferably, the compartment 84 has a small amount of water 90 therein so that when the instrument is not in use the disc 70 is maintained in a moist condition. Such has been found to prolong the life of the disc.

The meter 76 has a pointer 94, and the wires from the oxygen analyzing instrument are connected to the meter. In a preferred construction, the wires have a coiled section 93 providing compactness of the wires when the instrument 10 is in the holder but allowing the instrument to be lowered into a pool or the like for testing without taking the holder off the person.

FIG. 6 shows another combination of important usage by the present instrument wherein it also operates a meter 76'. The meter in this structure has a pointer 94' with a projecting portion 96 which extends beyond the pivot point of the pointer and which carries a segmental curved contact finger 98. Mounted in the meter for engagement by the finger 98 is a contact 100 connected to one side of a relay 102 by a wire 104. The other wire 106 to the relay comprises an infeed line. The other infeed line 108 is connected to the pointer 94 which is electrically conductive so that electric current is accessible to the finger 98. Relay 102 controls the operation of a switch 110 in a line 112 leading from one side of an ozone generator 114 to a contact 116 in the meter 76' loacted in spaced relation from contact 100. A line 118 from the other side of the ozone generator 114 leads to infeed line 108. A signal device 120 such as a red light, buzzer, or the like is connected into the line 112, and an on-off switch 122 controlling the circuit to the relay and the generator is connected into the infeed line 108.

In the operation of the system of FIG. 6, the ozone generator will be placed in operation when the instrument 10 indicates a low amount of dissolved oxygen. That is, by the arrangement of the parts, the pointer 94' will be at a low figure on the meter when a low dissolved oxygen content exists and the finger 98 on such pointer at such condition will engage contact 100 to energize the relay which closes the switch 110 and causes the generator 114 to operate. Such circuit is through wire 108, pointer 94 to its contact finger 98, contact 100, wire 104, relay 102, and outfeed line 106. The circuit to the ozone generator is through infeed line 106 to the wire 112, through the switch 110 which is now closed, through the generator 114, and out wire 118 to the other infeed line 108.

The contact finger 98 and its length as well as the location of contact 100 are arranged such that the contact finger will engage the contact between a zero reading of the meter and a reading of the latter at which it is desired that the generator be shut off. Thus, the system is automatic in that when the dissolved oxygen content is below the desired level, the finger remains in engagement with the contact 100 to maintain the generator in operation. As the dissolved oxygen increases, the pointer 94' moves up to the selected reading of the meter where the finger 98 disengages from the contact to shut off the generator. The contact 116 is arranged such that when the ozone generator is shut-off, the contact finger 98 engages the said contact to turn on the signal device 120. This signal gives notice that the dissolved oxygen content has risen to a desired level and if desired the unit can be moved to another location.

It is to be understood that the forms of our invention herein shown and described are to be taken as preferred examples of the same and that various changes in the shape, size and arrangement of parts may be resorted to without departing from the spirit of our invention or the scope of the subjoined claim.

Having thus described our invention, we claim:

1. An oxygen analyzing instrument comprising:
    (a) a body portion having a head end and a handle end,
    (b) an assembly of electrodes at the head end of said body portion,
    (c) said electrode assembly terminating at said head end of the body portion in a domed end surface,
    (d) an inner membrane of electrolyte absorbing material on said end surface of the electrode assembly.
    (e) means arranged to feed an electrolyte to said inner membrane,
    (f) an outer membrane overlying said inner membrane and being permeable to oxygen and impermeable to liquid,
    (g) an open-center holder secured to an outer peripheral portion of said outer membrane,
    (h) shoulder means around said head end,
    (i) an end cap removably connected to said body portion having an inner abutting surface aligned with said shoulder means and clamping said holder against the outer peripheral portion of said outer membrane and against said shoulder means so as to stretch said outer membrane smoothly across said domed end surface,
    (j) said end cap having a central opening through which liquid is admitted to said outer membrane,
    (k) a plurality of radial apertures leading from said central opening to the exterior of said cap,
    (l) and a plurality of venting apertures leading from said abutting surface to said radial apertures.

References Cited
UNITED STATES PATENTS

| | | | |
|---|---|---|---|
| 2,913,386 | 11/1959 | Clark | 204—195 |
| 3,334,623 | 8/1967 | Hillier et al. | 204—195 |
| 3,357,908 | 12/1967 | Riseman et al. | 204—195 |
| 3,394,069 | 7/1968 | Solomons | 204—195 |
| 3,503,861 | 3/1970 | Volpe | 204—195 |
| 3,510,421 | 5/1970 | Gealt | 204—195 |
| 3,575,836 | 4/1971 | Sternberg | 204—195 |
| 3,211,638 | 10/1965 | Halvorsen | 204—195 P |
| 3,278,408 | 10/1966 | Leonard et al. | 204—195 P |
| 3,325,378 | 6/1967 | Greene et al. | 204—195 P |
| 3,577,332 | 5/1971 | Porter et al. | 204—195 P |

TA-HSUNG TUNG, Primary Examiner